United States Patent
Liu et al.

(10) Patent No.: US 8,245,314 B2
(45) Date of Patent: Aug. 14, 2012

(54) SYSTEM AND METHOD FOR THE PREVENTION OF MALICIOUS FILE COPYING

(75) Inventors: Chih-Chieh Liu, Taipei Hsien (TW); Wei-Yuan Chen, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 330 days.

(21) Appl. No.: 12/612,072

(22) Filed: Nov. 4, 2009

(65) Prior Publication Data
US 2010/0275273 A1    Oct. 28, 2010

(30) Foreign Application Priority Data
Apr. 25, 2009 (CN) .......................... 2009 1 0301854

(51) Int. Cl.
*H04N 7/16*    (2011.01)

(52) U.S. Cl. .......................................................... 726/32
(58) Field of Classification Search .......................... None
See application file for complete search history.

(56) References Cited

U.S. PATENT DOCUMENTS
7,950,066 B1 * 5/2011 Zuili .............................. 726/33
* cited by examiner

*Primary Examiner* — Brandon Hoffman
(74) *Attorney, Agent, or Firm* — Altis Law Group, Inc.

(57) ABSTRACT

A system and method for the prevention of malicious file copying detects a file copy operation indicative of copying a file to an electronic clipboard. If the file copy operation is detected, the computer reads file contents of the copied file, and scrambles the file contents. If a file paste operation indicative of the copied file being pasted to a designated file system path, the computer pastes the scrambled file to the designated file system path. File attributes of the scrambled file are the same as file attributes of the copied file.

11 Claims, 3 Drawing Sheets

SYSTEM AND METHOD FOR THE PREVENTION OF MALICIOUS FILE COPYING

BACKGROUND

1. Technical Field

Embodiments of the present disclosure relate to manage files in a computer, and more particularly to a system and method for the prevention of malicious file copying.

2. Description of Related Art

Security of files in a computer is important. At present, files may be set passwords so as to prevent the files from being copied. But the passwords may be decrypted illegally.

What is needed, therefore, is an improved system and method for the prevention of malicious file copying.

DETAILED DESCRIPTION

All of the processes described below may be embodied in, and fully automated via, functional modules executed by one or more general purpose processors. The functional modules may be stored in any type of computer-readable medium or other computer storage device. Some or all of the methods may alternatively be embodied in specialized computer hardware or communication apparatus.

Figure 1:
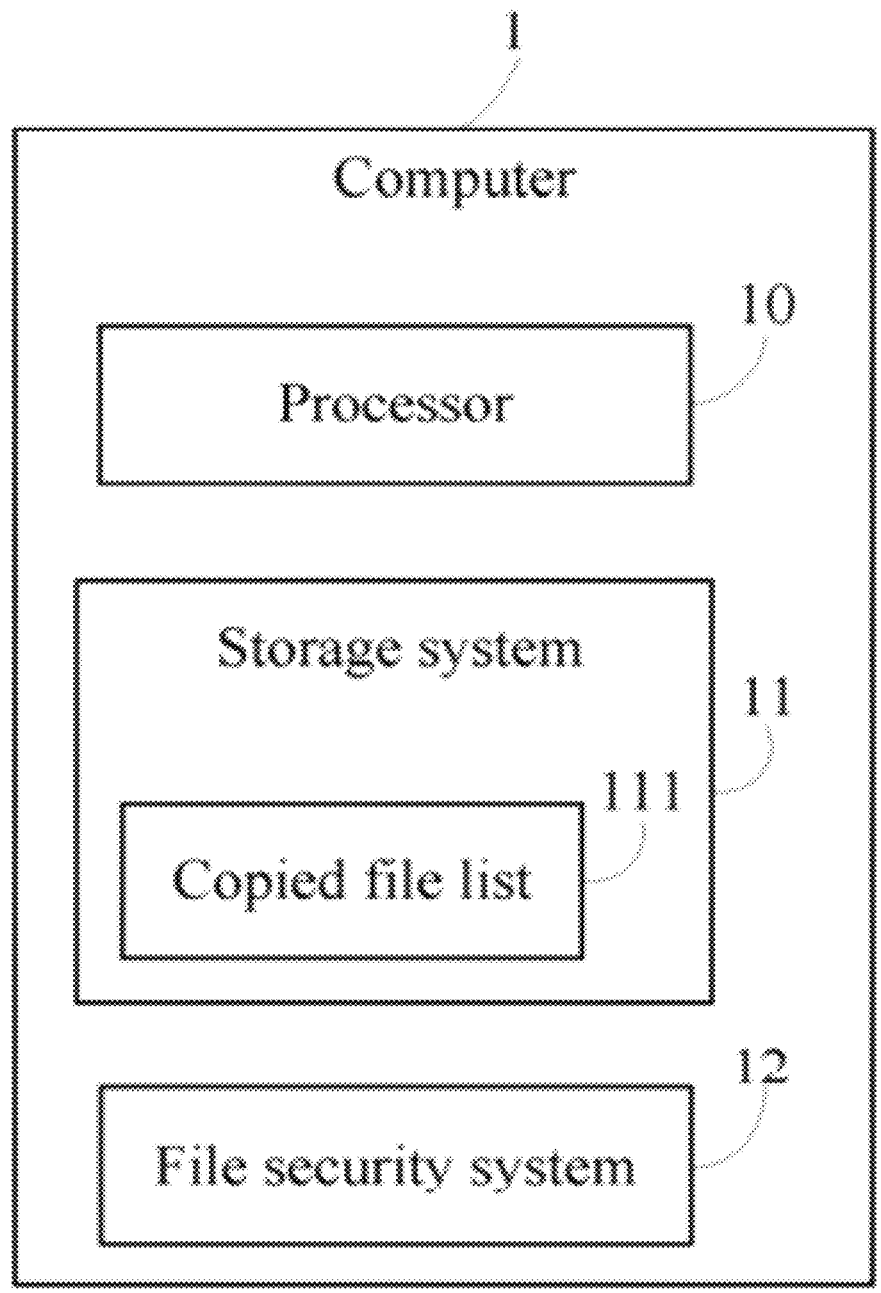
FIG. 1 is a block diagram of one embodiment of a computer comprising a file security system.

FIG. 1 is a block diagram of one embodiment of a computer 1 comprising a file security system 12. The file security system 12 may be used to secure data files of the computer 1. The computer 1 includes a processor 10 and a storage system 11. The processor 10 executes one or more computerized operations of the computer 1 and other applications, to provide the functions of the computer 1. The storage system 11 stores one or more programs, such as programs of an operating system, other applications of the computer 1, and various kinds of data, such as the personalized function settings and the original settings of the function settings of the computer 1, messages, or E-mails, for example. A copied file list 111 is stored in the storage system 11. The copied file list 11 is an electronic file that lists filenames and file paths (e.g., D:\document) of all illegal copied files.

Figure 2:
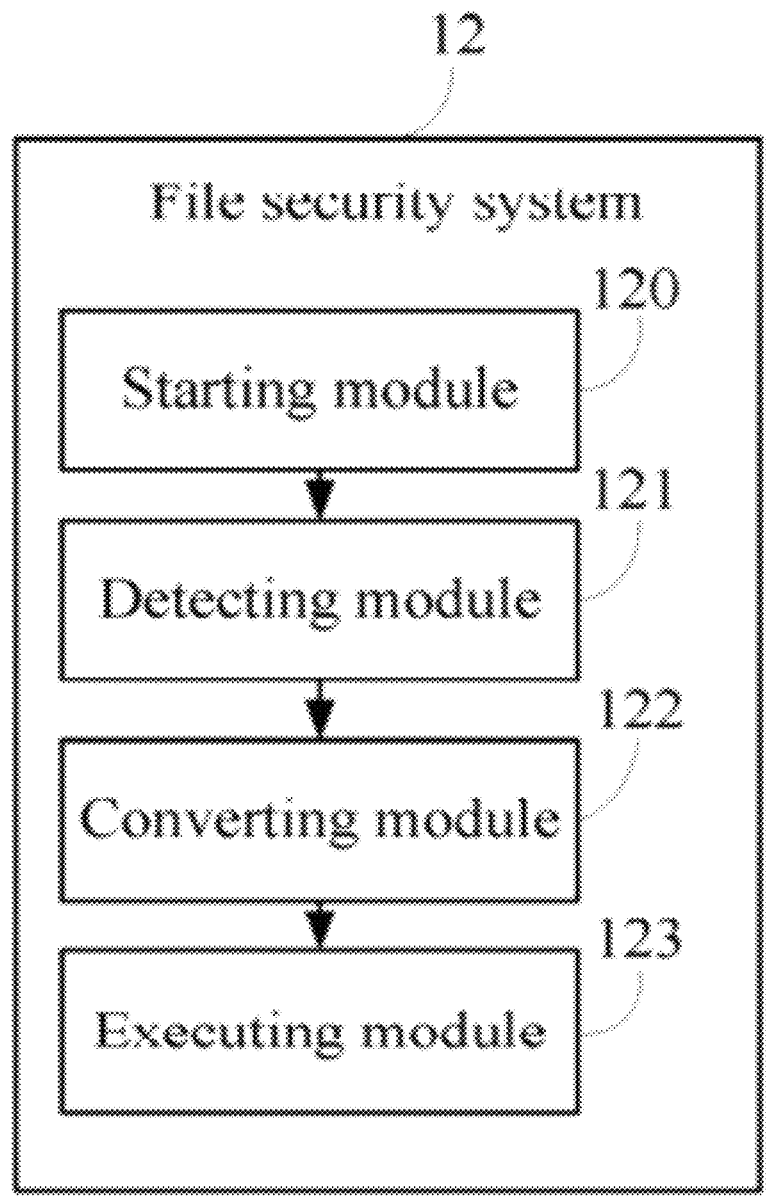
FIG. 2 is a block diagram of one embodiment of functional modules of the file security system in FIG. 1.

FIG. 2 is a block diagram of functional modules of the file security system 12 in FIG. 1. In one embodiment, the file security 10 may include a starting module 120, a detecting module 121, a conversing module 122, and an executing module 123. It may be understood that the processor 10 may be used to execute one or more computerized codes of the functional modules 120-123. The one or more computerized codes of the functional modules 120-123 may be stored in the storage system 11.

The starting module 120 presets a password used to invoke the file security system 12. The setting module 120 also validates an input password when the file security system 12 is invoked. If the input password is valid, the starting module 120 invokes the file security system 12. For example, a user may input a password using a soft or hardware keyboard of the computer 1.

The detecting module 121 detects a file copy operation when a file is copied to an electronic clipboard of the computer 1. In one embodiment, the detecting module 121 may associate with the electronic clipboard by a "SetClipboardViewer ()" function of Win32API, and override a "WindowProc ( )" function. The detecting module 121 detects if the computer 1 receives a copy command (e.g., WM_DRAWCLIPBOARD command). When a malicious user intrudes into the computer 1 and copies a file of the computer 1, the computer 1 receives the copy command It is denoted that a file is copied to the electronic clipboard. For example, if the malicious user selects the file and presses a "Ctrl" key and a "C" key of the keyboard of the computer 1 at the same time, the computer 1 receives the copy command If the file copy operation is detected, the converting module 122 reads file contents of the copied file listed in the electronic clipboard, and scrambles the file contents of the copied file using an arithmetic method. It should be understood that characters of the file content may include binary values, octal values, decimal values, or hexadecimal values. The arithmetic method may be any mathematic arithmetic. For example, the characters of the file content may be represented as six hexadecimal bytes: "73 61 6D 70 6C 65." In one example, the converting module 122 may subtract each hexadecimal byte by "0XFF." Thus, the converted bytes are "8C 9E 92 8F 93 9A." File attributes of the scrambled file remain the same as the copied file. In one embodiment, the file attributes of the file may include a file size, a file format, a file name, and a file path in the computer 1.

The detecting module 121 detects a file paste operation indicative of the copied file being pasted to a designated file system path. The malicious user may paste the copied file to a universal serial bus (USB) removable hard disk, for example. The detecting module 121 detects the file paste operation of the copied file being pasted to the USB removable hard disk. In one embodiment, the detecting module 121 detects if the computer 1 receives a paste command (e.g., WM_PASTE command) If the computer 1 receives the paste command, it is denoted that the copied file is to be pasted to the designated path. For example, if the malicious user presses the "Ctrl" key and a "V" key of the keyboard of the computer 1 at the same time, the computer receives the paste command If the file paste operation is detected, the executing module 123 pastes the scrambled file instead of the copied file to the designated file system path. The executing module 123 also stores the file name and the file path of the copied file into the copied file list 111.

Figure 3:
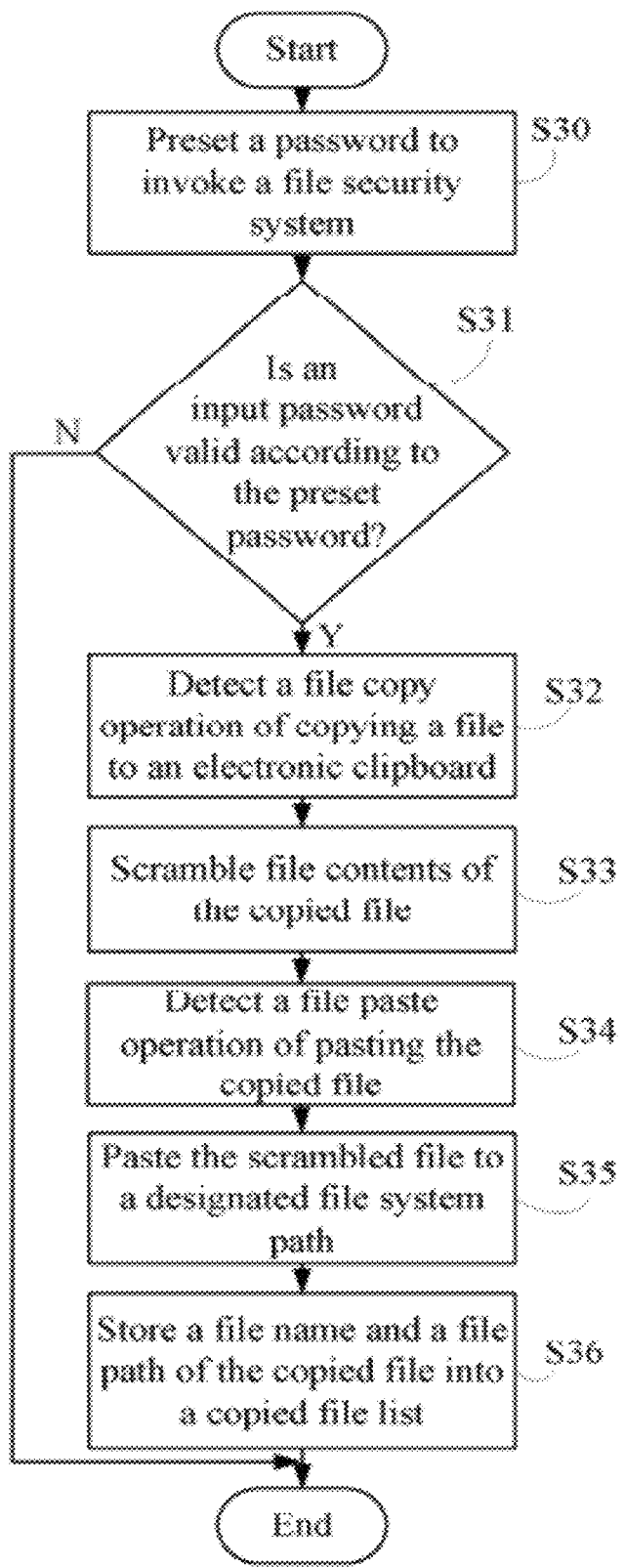
FIG. 3 is a flowchart of one embodiment of a method for the prevention of malicious file copying.

FIG. 3 is a flowchart of one embodiment of a method for the prevention of malicious file copying. Depending on the embodiment, additional blocks may be added, others removed, and the ordering of the blocks may be changed.

In block S30, the starting module 120 presets a password used to invoke the file security system 12.

In block S31, the starting module 121 detects if an input password is valid according to the preset password. If the input password is valid, block S32 is implemented. If the input password is invalid, the procedure ends.

In block S32, the detecting module 121 detects a file copy operation when a file is copied to an electronic clipboard of the computer 1. When a malicious user intrudes into the computer 1 and copies a file of the computer 1, the computer 1 receives the copy command.

In block S33, the converting module 122 reads contents of the copied file listed in the clipboard, and scrambles the file contents of the copied file using an arithmetic method. File attributes of the scrambled file remain the same as the copied file. In one embodiment, the file attributes of the file may include a file size, a file format, a file name, and a file path in the computer 1.

In block S34, the detecting module 121 detects a file paste operation indicative of the copied file being pasted to a designated file system path. For example, the malicious user may paste the copied file to a universal serial bus (USB) removable hard disk. The detecting module 121 detects the file paste operation of pasting the copied file to the USB removable hard disk.

In block S35, the executing module 123 pastes the scrambled file instead of the copied file to the designated file system path.

In block S36, the executing module 123 stores the file name and the file path of the copied file into the copied file list 111.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. A system, comprising:
   a storage system; and
   at least one processor to execute one or more programs stored in the storage system, the one or more programs comprising:
   a detecting module operable to detect a file copy operation indicative of a file being copied to an electronic clipboard of the system;
   a converting module operable to read file contents of the copied file listed in the electronic clipboard, and scramble the file contents using an arithmetic method, wherein file attributes of the scrambled file are the same as file attributes of the copied file, and the file attributes of the copied file comprise a file size, a file format, a file name, and a file path in the system;
   the detecting module also operable to detect a file paste operation indicative of the copied file being paste to a designated file system path; and
   an executing module operable to paste the scrambled file to the designated file system path, and to store the file name and the file path of the copied file into a copied file list stored in the storage system.

2. The system of claim 1, further comprising a starting module operable to preset a password to invoke the system, and validate an input password according to the preset password.

3. The system of claim 1, wherein characters of the file contents include binary values, octal values, decimal values, and/or hexadecimal values.

4. The system of claim 1, wherein the arithmetic method is a mathematic arithmetic method.

5. A method for the prevention of malicious file copying, the method comprising:
   (a) detecting a file copy operation indicative of a file being copied to an electronic clipboard of a system;
   (b) reading file contents of the copied file listed in the electronic clipboard, and scrambling the file contents using an arithmetic method, wherein file attributes of the scrambled file are the same as file attributes of the copied file, and the file attributes of the copied file comprise a file size, a file format, a file name, and a file path in the system;
   (c) detecting a file paste operation indicative of the copied file being pasted to a designated file system path; and
   (d) pasting the scrambled file to the designated file system path, and storing the file name and the file path of the copied file into a copied file list stored in the storage system.

6. The method of claim 5, before block (a) further comprising:
   presetting a password and detects if an input password is valid according to the preset password; and
   implementing block (a) if the input password is valid.

7. The method of claim 5, wherein characters of the file contents include binary values, octal values, decimal values, and/or hexadecimal values.

8. A non-transitory storage medium having stored therein instructions that, when executed by a computer, cause the computer to perform a method for the prevention of malicious file copying comprising:
   (a) detecting a file copy operation indicative of a file being copied to an electronic clipboard of the computer;
   (b) reading file contents of the copied file listed in the electronic clipboard, and scrambling the file contents using an arithmetic method;
   (c) detecting a file paste operation indicative of the copied file being pasted to a designated file system path, wherein file attributes of the scrambled file are the same as file attributes of the copied file, and the file attributes of the copied file comprise a file size, a file format, a file name, and a file path in the system; and
   (d) pasting the scrambled file to the designated file system path, and storing the file name and the file path of the copied file into a copied file list stored in the storage system.

9. The non-transitory storage medium of claim 8, before block (a) further comprising:
   presetting a password and detects if an input password is valid according to the preset password; and
   implementing block (a) if the input password is valid.

10. The non-transitory storage medium of claim 8, wherein characters of the file contents include binary values, octal values, decimal values, and/or hexadecimal values.

11. The non-transitory storage medium of claim 8, wherein the arithmetic method is a mathematics arithmetic method.

* * * * *